Sept. 21, 1965     E. C. BETTONI ETAL     3,207,864
DISTRIBUTOR MECHANISM WITH EASILY MOVABLE BREAKER PLATE
Filed Jan. 23, 1961                    8 Sheets-Sheet 2

INVENTORS.
EUGENE C. BETTONI
BY ERNEST R. LARGES
Whittemore
Hulbert & Belknap
ATTORNEYS.

Sept. 21, 1965 E. C. BETTONI ETAL 3,207,864
DISTRIBUTOR MECHANISM WITH EASILY MOVABLE BREAKER PLATE
Filed Jan. 23, 1961 8 Sheets-Sheet 3
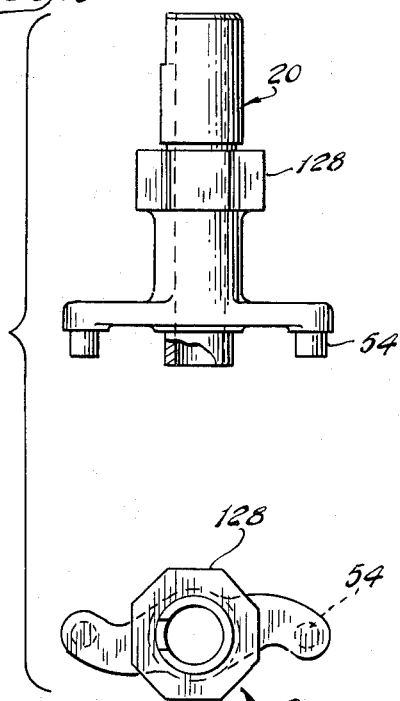
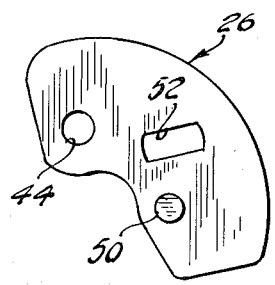
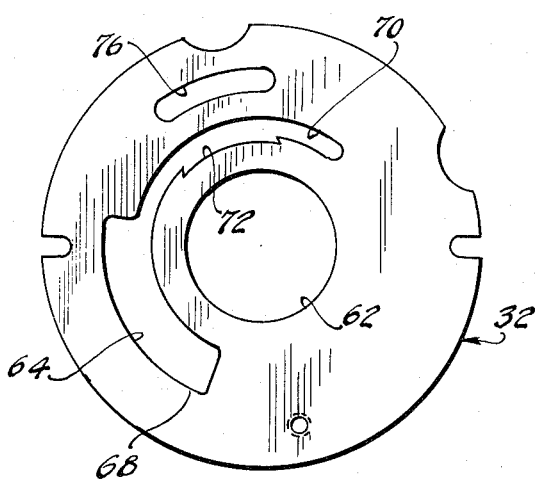
INVENTOR.
EUGENE C. BETTONI
BY ERNEST R. LARGES
ATTORNEYS

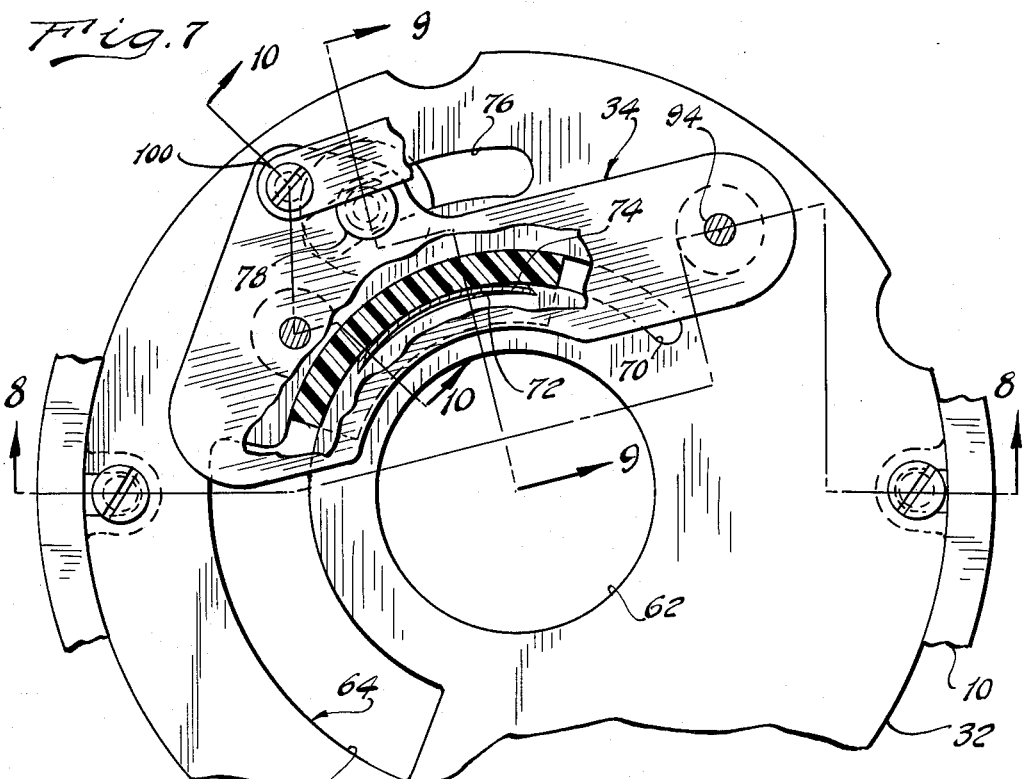
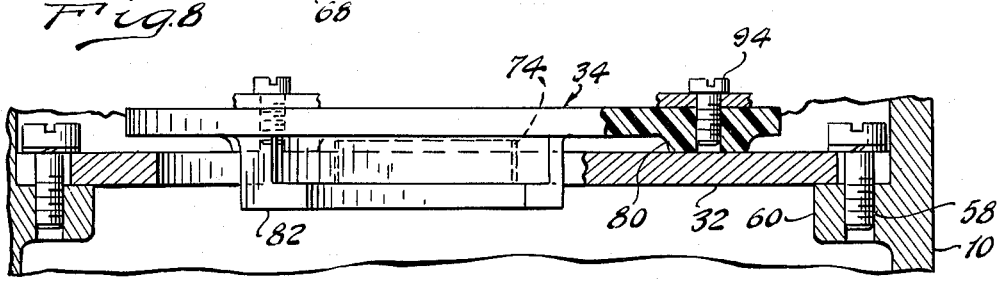
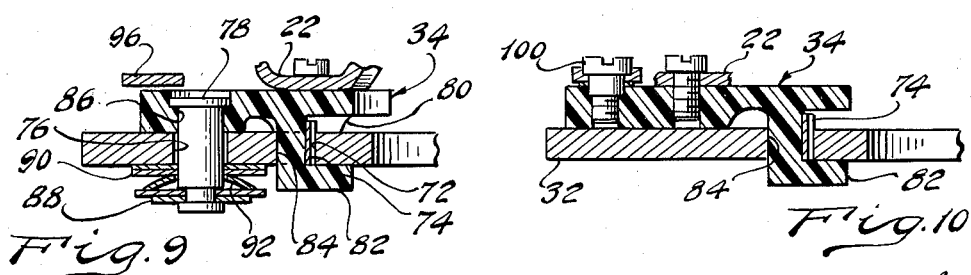

Sept. 21, 1965     E. C. BETTONI ETAL     3,207,864
DISTRIBUTOR MECHANISM WITH EASILY MOVABLE BREAKER PLATE
Filed Jan. 23, 1961     8 Sheets-Sheet 5
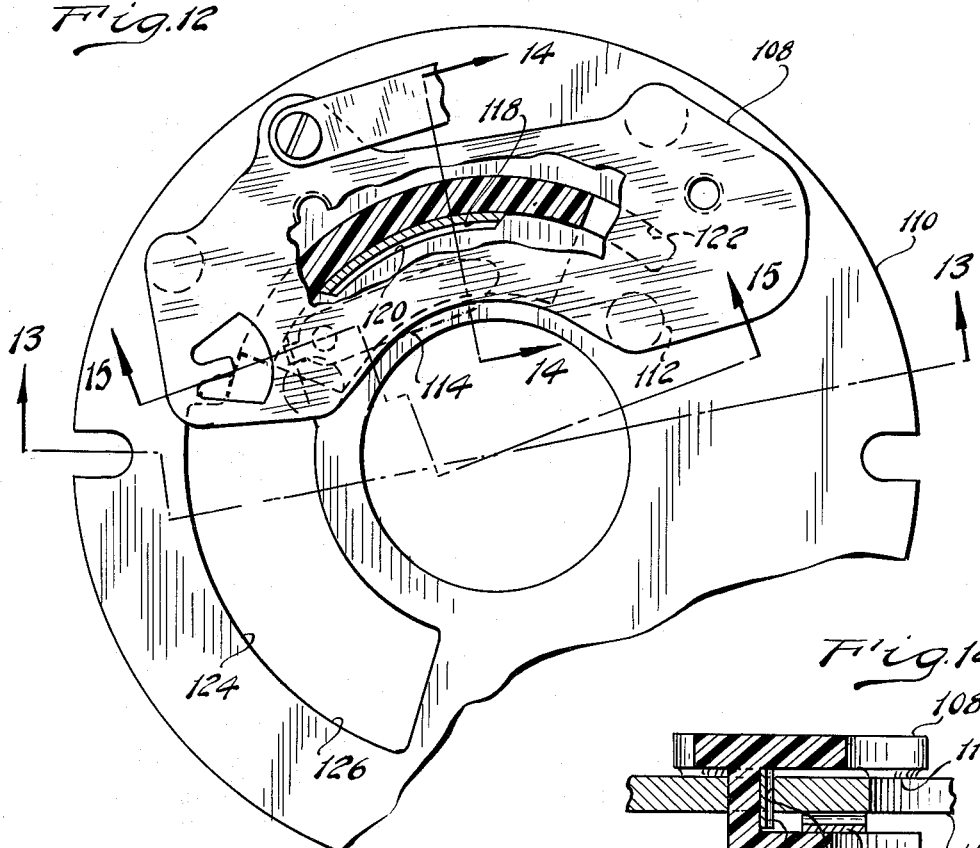
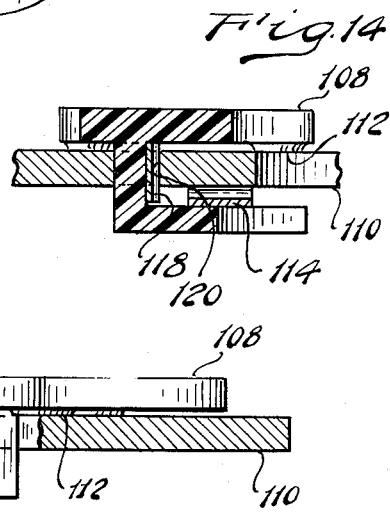
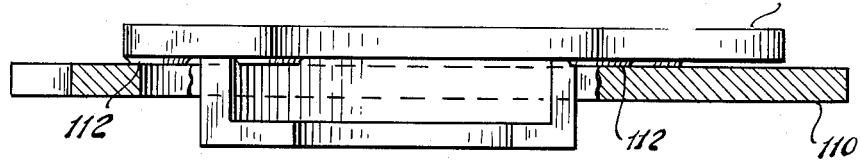
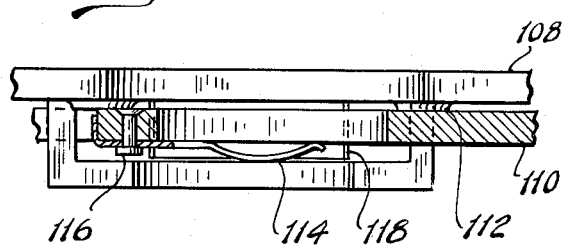
INVENTORS.
EUGENE C. BETTONI
BY ERNEST R. LARGES
ATTORNEYS.

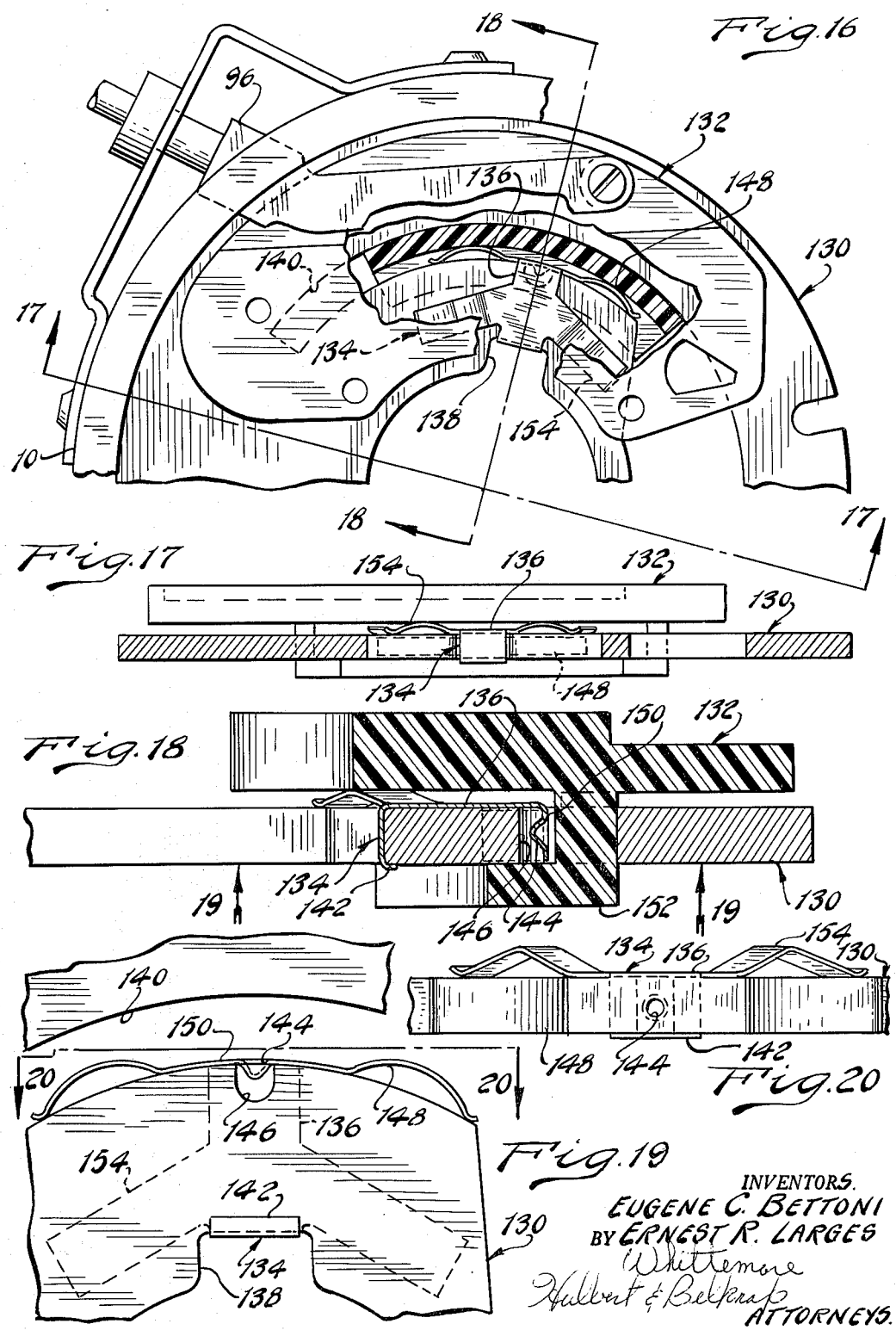

Sept. 21, 1965  E. C. BETTONI ETAL  3,207,864
DISTRIBUTOR MECHANISM WITH EASILY MOVABLE BREAKER PLATE
Filed Jan. 23, 1961  8 Sheets-Sheet 7

INVENTORS.
EUGENE C. BETTONI
BY ERNEST R. LARGES
ATTORNEYS.

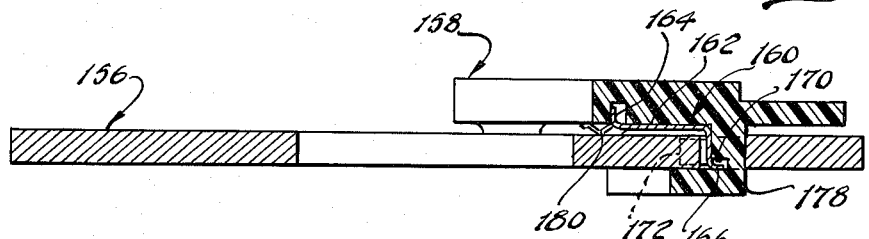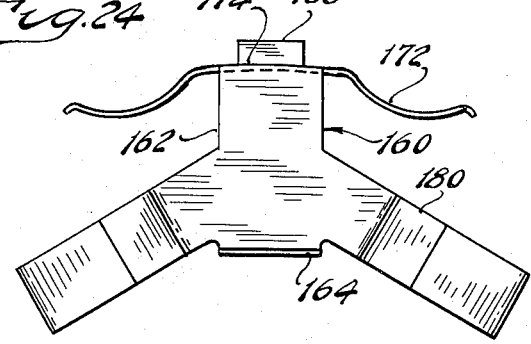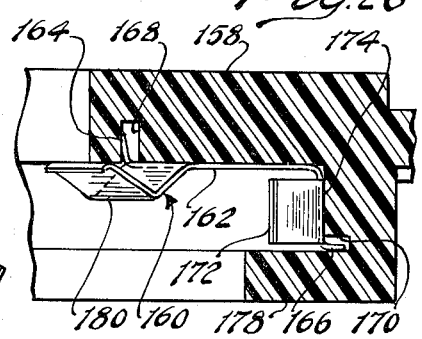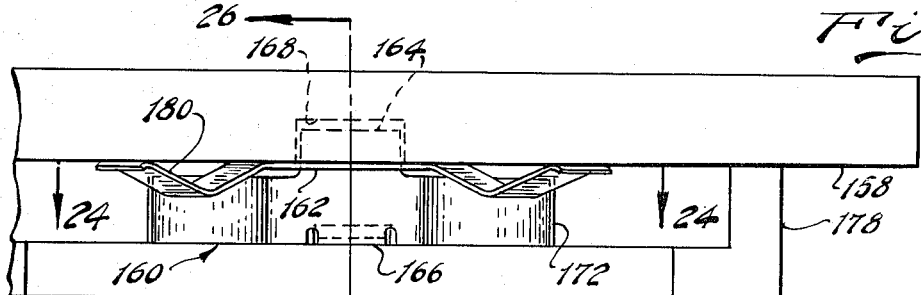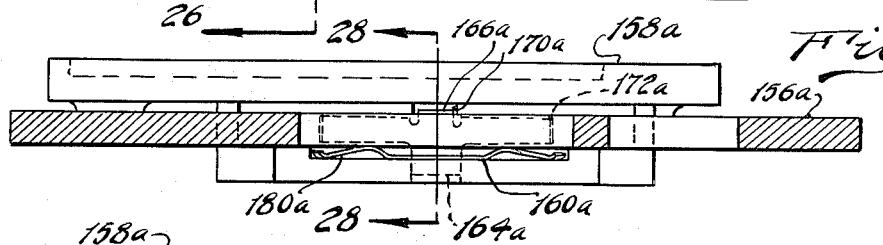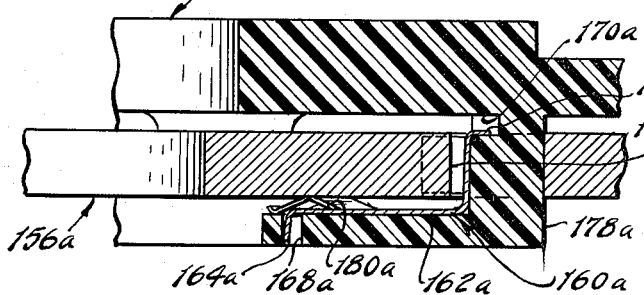

United States Patent Office 3,207,864
Patented Sept. 21, 1965

3,207,864
DISTRIBUTOR MECHANISM WITH EASILY MOVABLE BREAKER PLATE
Eugene C. Bettoni, Birmingham, and Ernest R. Larges, Detroit, Mich., assignors to Holley Carburetor Company, Warren, Mich., a corporation of Michigan
Filed Jan. 23, 1961, Ser. No. 84,254
12 Claims. (Cl. 200—31)

The invention relates to distributors and refers more specifically to an ignition distributor for an internal combustion engine or similar device including a simplified spark timing advance centrifugal weight assembly and a vacuum spark timing advance mechanism including an easily replaceable, movable breaker plate.

In the past distributors having a movable breaker plate included in vacuum spark timing mechanism have been known. However, distributors having movable breaker plates have in the past generally been defective in that the movable breaker plate has not previously been sufficiently stable to prevent wobbling thereof without the inclusion of parts making the distributor uneconomical to produce. The wobbly breaker plates of the past produce excessive wear on the component parts of the distributor, especially the contacts, resulting in reduced distributor efficiency.

In addition previously provided movable breaker plates have often been secured with the distributor by such complicated means and so positioned therein, as for example surrounding the distributor cam shaft that removal and replacement thereof is a very difficult task. The prior breaker plates have also usually been metal members which when lubricated to act properly also collect dust and dirt on the lubricated metal surfaces.

Also distributors as previously known have included spark timing advance centrifugal weight assemblies. Prior assemblies have however also required a plurality of separate parts such as a separate cam, cam sleeve, and separate slot pins and means for connecting the slot pins to the cam sleeve, so that prior centrifugal weight assemblies were expensive to produce. In addition such assemblies previously produced have not been extremely accurate at low engine speeds which is of course undesirable.

It is therefore an object of the present invention to provide a distributor having a spark timing advance centrifugal weight assembly and vacuum spark timing advance mechanism using a minimum number of elements.

Another object is to provide a distributor having vacuum spark timing advance mechanism including a movable breaker plate which is held firmly in adjusted positions.

Another object is to provide a distributor including a spark timing advance centrifugal weight assembly having an integral cam, sleeve and slot pins, and including heavy advance weights formed of stamped metal rotatable about bushings provided therefor.

Another object is to provide a distributor having vacuum spark timing advance mechanism including a movable breaker plate formed from a plastic adjustably mounted on a fixed breaker plate by means of a pin and slot connection which is resiliently held in fixed adjusted positions.

Another object is to provide a distributor having vacuum spark timing advance mechanism as set forth above wherein the movable breaker plate is adjustably held in a slot in a fixed breaker plate which is concentric with and entirely at one side of the distributor cam axis, and which is held in adjusted position within the slot by a single spring mounted on either the fixed or movable breaker plate.

Another object is to provide a distributor as set forth above having vacuum spark timing advance mechanism which mechanism includes a movable breaker plate formed from a plastic to which prealigned distributor contacts are secured whereby the contacts and movable breaker plate are simultaneously replaced when replacement of the contacts is required to provide prealigned contacts and new support pads for the movable breaker plate.

Another object is to provide a distributor which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is an elevation view of the distributor of the invention which is illustrated in section along the line 1—1 in FIGURES 2 and 11 at the elevation of the structure illustrated in FIGURES 2 and 11 respectively.

FIGURE 3 is an elevation and top view of the integral cam, sleeve, and slot pins of the spark timing advance centrifugal weight assembly of the distributor illustrated in FIGURE 1.

FIGURE 4 is a plan view of a weight of the spark timing advance centrifugal weight assembly of the distributor illustrated in FIGURE 1.

FIGURE 5 is a plan view of the shaft plate of the spark timing advance centrifugal weight assembly of the distributor illustrated in FIGURE 1.

FIGURE 6 is a plan view of the fixed breaker plate of the distributor illustrated in FIGURE 1.

FIGURE 7 is a plan view of the assembled fixed and movable breaker plates of the distributor illustrated in FIGURE 1.

FIGURE 8 is a partly broken away section view of the assembled fixed and movable breaker plates of the distributor illustrated in FIGURE 7 taken on the line 8—8 in FIGURE 7.

FIGURE 9 is a section view of the assembled fixed and movable breaker plates illustrated in FIGURE 7 taken on the line 9—9 of FIGURE 7.

FIGURE 10 is a section view of the assembled fixed and movable breaker plates illustrated in FIGURE 7 taken on the line 10—10 of FIGURE 7.

FIGURE 12 is a plan view of an assembled modified movable and fixed breaker plate for use with the distributor illustrated in FIGURE 1.

FIGURE 13 is an elevation view of the movable breaker plate illustrated in FIGURE 12 taken in the direction of line 13—13 in FIGURE 12 and showing the fixed breaker plate in dashed lines.

FIGURE 14 is a section view of the movable and fixed breaker plates illustrated in FIGURE 12 taken on the line 14—14 in FIGURE 12.

FIGURE 15 is a section view of the movable and fixed breaker plates illustrated in FIGURE 12 taken on the line 15—15 in FIGURE 12.

FIGURE 16 is a partial plan view of another fixed and movable breaker plate assembly with the movable breaker plate partly broken away.

FIGURE 17 is a section view of the modified breaker plate assembly of FIGURE 16 taken on the line 17—17 in FIGURE 16.

FIGURE 18 is a section view of the modified breaker plate assembly of FIGURE 16 taken on the line 18—18 in FIGURE 16.

FIGURE 19 is a partial bottom view of the fixed breaker plate and spring of the breaker plate assembly of FIGURE 16 taken in the direction of arrows 19 in FIGURE 18.

FIGURE 20 is a view of the fixed breaker plate and spring of FIGURE 19 taken in the direction of arrows 20 in FIGURE 19.

FIGURE 23 is a section view of the breaker plate assembly illustrated in FIGURE 21 taken on the line 23—23 in FIGURE 21.

FIGURE 24 is a plan view of the spring of the breaker plate assembly illustrated in FIGURES 21–23.

FIGURE 25 is a view of the assembled movable breaker plate and spring of the breaker plate assembly in FIGURES 21–23.

FIGURE 26 is a section view of the assembled movable breaker plate and spring illustrated in FIGURE 25 taken on the line 26—26 in FIGURE 25.

FIGURE 27 is a section view similar to that of FIGURE 22 and illustrating a modified movable breaker plate and differently positioned spring.

FIGURE 28 is a section view of the breaker plate assembly of FIGURE 27 taken on the line 28—28 in FIGURE 27.

With particular reference to the figures one embodiment of the invention will now be disclosed.

Figure 1:
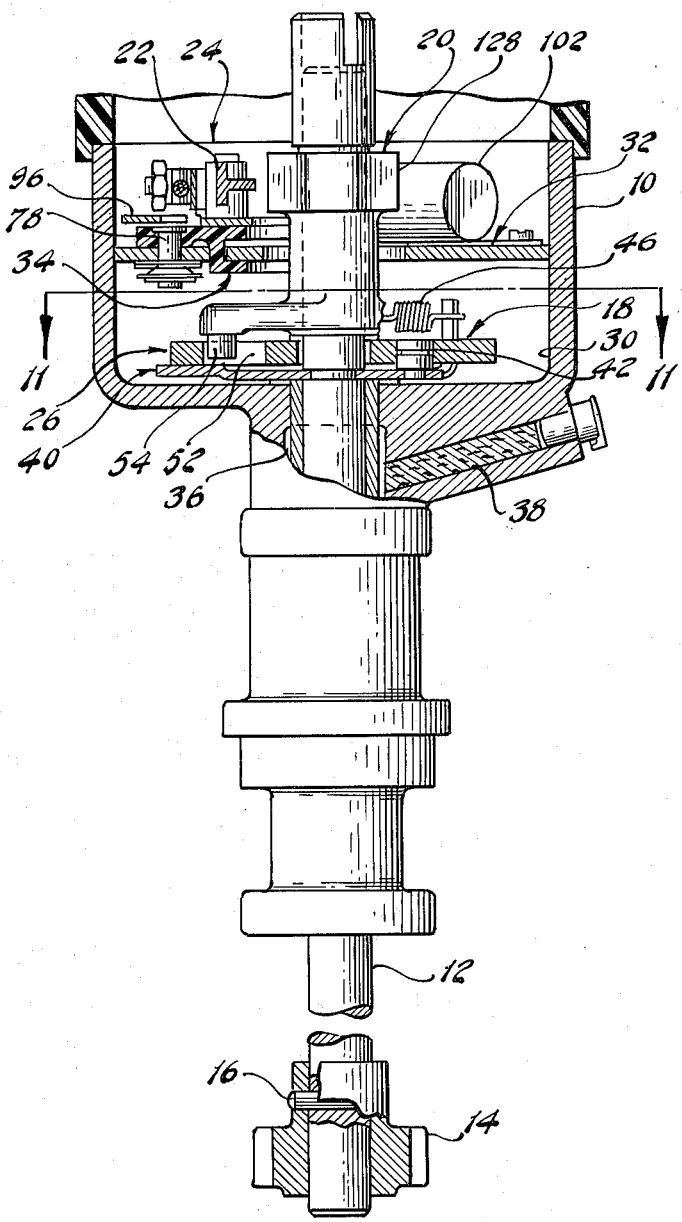

The distributor shown in FIGURE 1 comprises the housing 10, a shaft 12 rotatably mounted within the housing 10 adapted to be driven by the gear 14 fixed to the shaft 12 by means of the pin 16. The distributor further includes the spark timing advance centrifugal weight assembly 18 for positioning the integral cam, sleeve and slot pin member 20 in accordance with the speed of rotation of the shaft 12 to determine the time of opening of the contacts 22 shown best in FIGURE 2. A vacuum spark timing advance mechanism 24 is also provided in conjunction with the distributor shown in FIGURE 1 to further adjust the time of opening of the contacts 22 in accordance with pressure sensed by the diaphragm means 28.

In accordance with the invention the spark timing advance centrifugal weight assembly 18 includes heavy stamped advance weights 26 and an integral cam, sleeve and slot pin member 20. The vacuum spark timing advance mechanism 24 includes a replaceable, movable breaker plate 34 to which prealigned contacts 22 are secured, which breaker plate is constructed of a plastic and is resiliently held in adjusted positions.

More specifically the housing 10, shaped as shown best in FIGURE 1, includes the recess 30 into which the advance wieght assembly 18, including the integral cam, sleeve and slot pin member 20, the fixed breaker plate 32, movable breaker plate 34, and vacuum advance mechanism 24 are positioned, as shown in FIGURE 1. The shaft 12 is rotatable in the bearing 36 which is lubricated by the oily wick 38.

Figure 11:
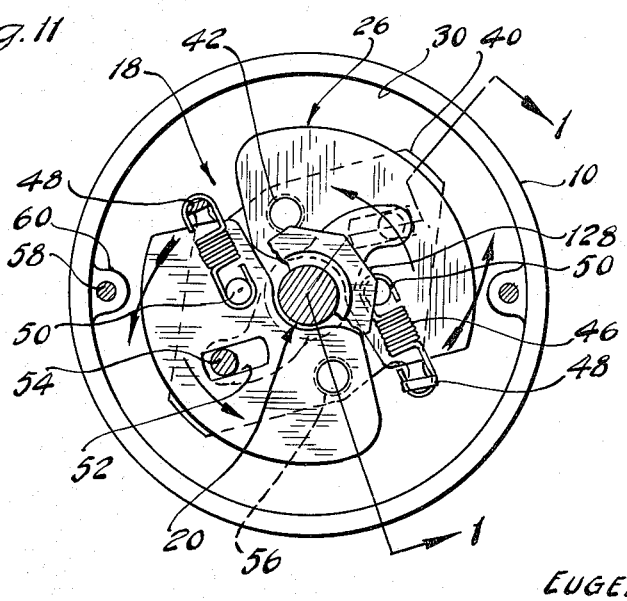
FIGURE 11 is a plan view of the assembled spark timing advance centrifugal weight assembly of the distributor illustrated in FIGURE 1 with the cam, sleeve and pin member partially broken away.
Figure 21:
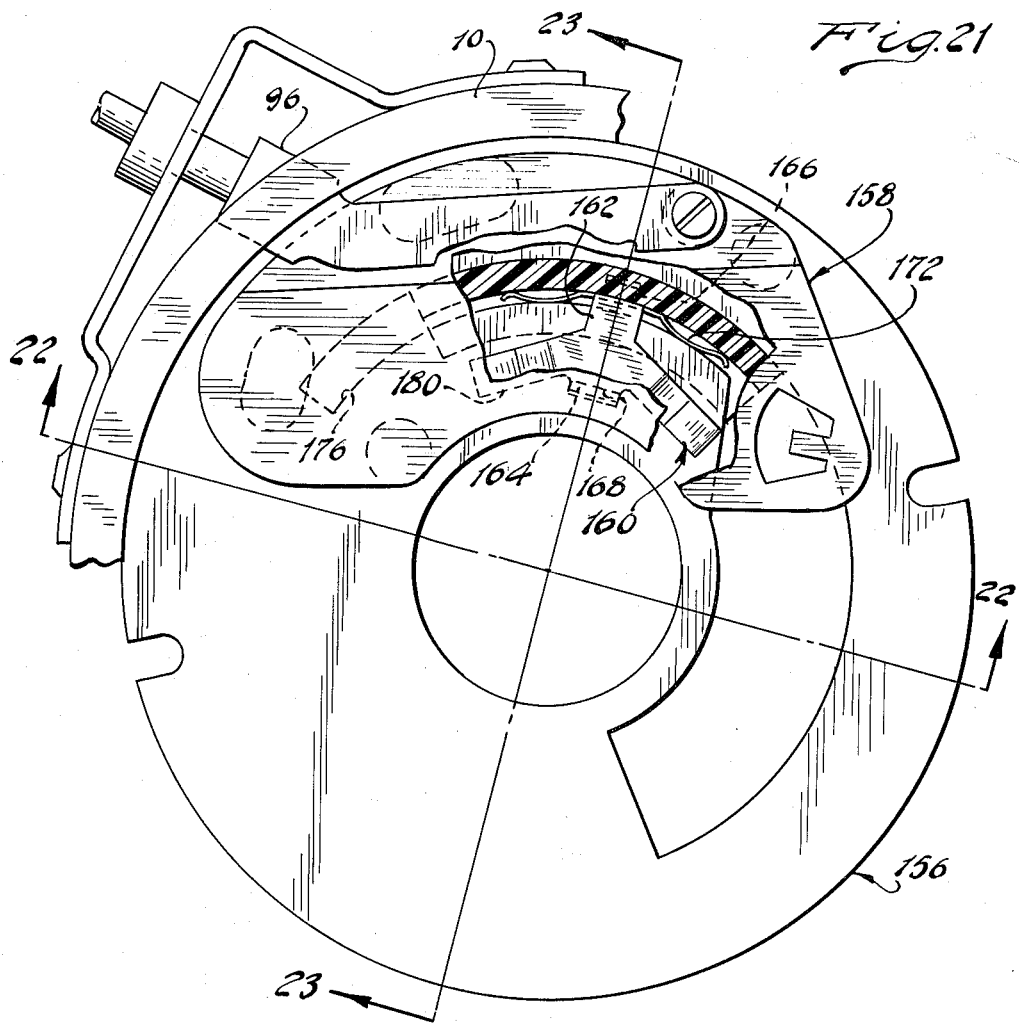
FIGURE 21 is a plan view of another fixed and movable breaker plate assembly with the movable breaker plate partially broken away.
Figure 22:
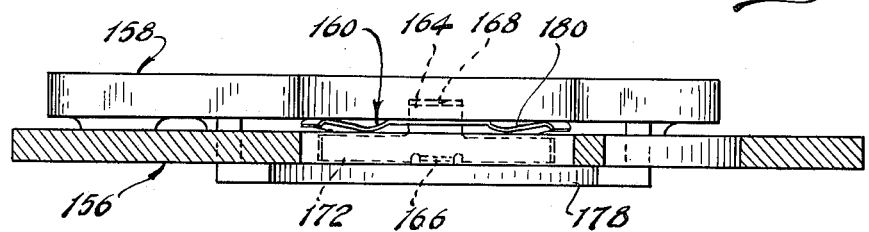
FIGURE 22 is a section view of the breaker plate assembly illustrated in FIGURE 21 taken on the line 22—22 in FIGURE 21.

The advance weight assembly 18, as shown in plan view in assembly in FIGURE 11, includes the shaft plate 40 secured to the rotatable shaft 12 by convenient means for rotation therewith and best shown in FIGURE 5, and the advance weights 26 pivotally mounted by means of the openings 44 therein on the posts 42, which posts are secured to the shaft plate 40. Springs 46 each having one end secured to an adjustable tab 48 of the shaft plate and the other end secured to a post 50 on an advance weight as shown best in FIGURE 11 are provided to bias the weights 26 in a clockwise direction so that they assume an inner position as shown in FIGURE 11 when the shaft 12 is not rotated. A slot 52 is provided in each of the advance weights 26 which is adapted to receive a slot pin portion 54 of the integral cam, sleeve and pin member 20.

Thus, in operation it will be seen that as the shaft 12 is rotated the weights 26 will be pivoted counterclockwise about the posts 42 in opposition to the bias of springs 46 to centrifugal force whereby the pins 54 within the slots 52 are cammed in an arcuate path to rotate the integral cam, sleeve and pin member 20 counterclockwise about the axis of the shaft 12 over which it is sleeved to adjust the opening time of the contacts 22 in accordance with the speed of rotation of the shaft 12.

The advance weights 26 in the distributor of the invention are relatively heavy, being over ninety grams in total weight, whereby accurate timing of the contacts opening and closing at low engine speeds may be accomplished. Further the weights 26 are stamped from steel or similar metal whereby they are of uniform weight since they possess no casting blow holes or similar defects. In addition the advance weights are mounted on bushings 56 to provide smoother action and longer life.

In addition the slots 52 are provided directly in the weights themselves and in conjunction with the integral cam, sleeve and pin member 20 provide an advance weight assembly using a minimum number of parts manufactured with the fewest number of steps which results in closer tolerances and consequent better performance. Further, the advance weight assembly 18 including the integral cam, sleeve and adjusting pin member 20 is more easily assembled and serviced due to the minimum number of individual parts and the particular construction thereof as described and shown.

As shown in FIGURE 1 the fixed breaker plate 32 is positioned within the recess 30 substantially centrally thereof and may be secured to the housing 10 by means of screws 58 extending through projections 60 on the radially inner surface of the housing 10, as shown best in FIGURE 8. The fixed breaker plate 32 illustrated in FIGURE 6 is provided with the central opening 62 through which the integral cam, sleeve and pin member 20 extends, as shown in FIGURE 1. A concentric arcuate slot 64 is also cut into the fixed breaker plate 32 and has a radially enlarged portion at end 68 thereof to permit ready installation and removal of the movable breaker plate 34 as will later be considered.

The other end 70 of the arcuate slot 64 is of smaller radial extent and forms a guide in which the movable breaker plate 34 is adjusted concentrically with the cam, sleeve and pin member 20 by the vacuum advance mechanism 24. A recess 72 is provided in the end 70 of the slot 64 to receive the leaf-spring 74 shown best in FIGURES 7 and 9. The leaf-spring 74 is of slightly greater length than the recess 72 whereby the leaf-spring is bowed in installation to resiliently engage the movable breaker plate 34 to insure that the breaker plate 34 does not move radially within the slot 70. The fixed breaker plate 32 further includes the arcuate slot 76 concentric with the slot 64 which receives the guide pin 78 secured to the movable breaker plate 34, as shown best in FIGURE 9.

The movable breaker plate 34, shown best in FIGURES 7–10, is preferably made from a plastic such as Delrin. Support pads 80 are provided on the underside of the movable breaker plate 34 which slidably engage the fixed breaker plate 32, as shown in FIGURE 8. An arcuate L-shaped portion 82 is secured to the underside of the movable breaker plate 34 and is adapted to pass through the radially enlarged end 68 of the slot 64 and to be slidably positioned within the end 70 of the slot 64 with the L-shaped portion 82 engaging the radially outer surface 84 of the slot 64 and in close proximity to the under-surface of the fixed breaker plate 32, as shown best in FIGURE 9. With the leaf-spring 74 urging the L-shaped portion 82 of the movable breaker plate 34 into resilient contact with the radially outer surface 84 of the fixed breaker plate 32 undesirable radial movement of the movable breaker plate 34 is prevented.

With the movable breaker plate 34 positioned in the end 70 of the slot 64 the pin 78 may be inserted through the countersunk opening 86 in the movable breaker plate 34 and the slot 76 in the fixed breaker plate as shown best in FIGURE 9 and is held in place by means of the removable clip 88. The washers 90 and annular spring 92 are provided to maintain the support pads 80 of the movable breaker plate 34 in surface-to-surface contact with the upper surface of the fixed breaker plate 32 to prevent wobbling of the movable breaker plate.

Figure 2:
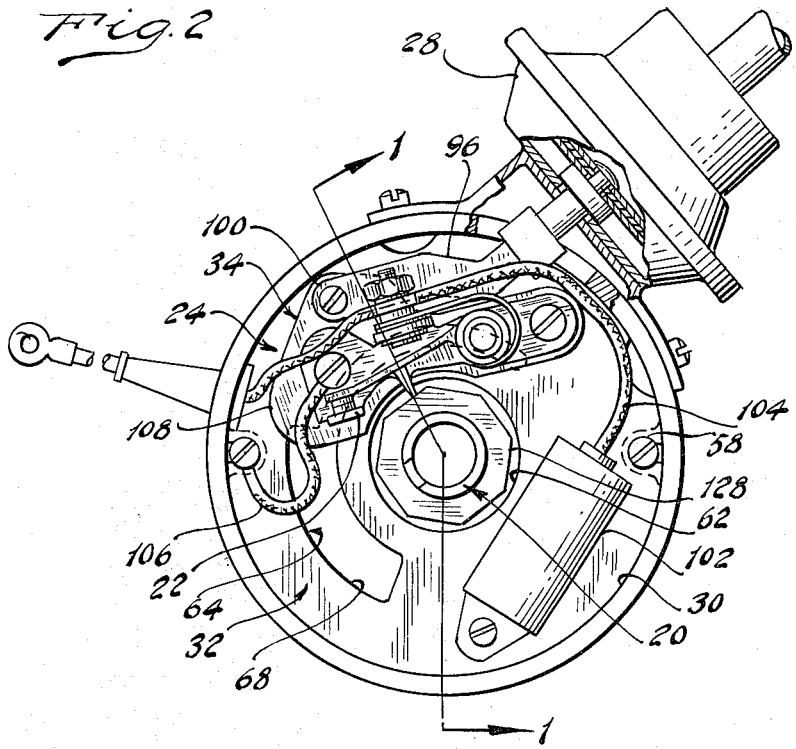
FIGURE 2 is a partially broken away plan view of the distributor illustrated in FIGURE 1 with the distributor cap removed.

Contacts 22, as shown best in FIGURE 2, are secured to the movable breaker plate 34 by convenient means, such as screws 94. The control arm 96 of the pressure responsive diaphragm means 28 is pivotally secured to the movable breaker plate 34 by means of the pivot pin 100. The usual condenser 102 and electrical connections 104 and 106 are provided in the distributor of the invention as shown in FIGURE 2.

In operation as the pressure which is sensed by the pressure responsive diaphragm means 28 is varied, for example as the manifold pressure of an internal combustion engine with which the distributor is associated, the control arm 96 is moved substantially axially to adjust the movable breaker plate 34 in the end 70 of the slot 64 concentrically with the sleeve, cam and pin member 20.

The movable breaker plate 34 provides a constant contact dwell due to the concentric nature of the end 70 of the slot 64 with the cam, sleeve and pin member 20. Further the movable breaker plate 34 of FIGURES 7–10 is not subject to wobbling since the pin 78 and spring 92 maintains the support pads 80 of the Delrin movable breaker plate 34 in contact with the surface of the fixed breaker plate 32 at all times and the spring 74 prevents undesirable radial movement of the movable breaker plate 34.

In addition it will be noted that since movable breaker plate 34 is constructed of Delrin that the movable breaker plate is self-lubricating and therefore is not subject to collecting dust and other material which would impair the movement thereof, such as would be the case with a lubricated movable breaker plate constructed of metal. The movable breaker plate 34 of the invention also has the advantage of being located on only one side of the integral cam, sleeve and pin member 20 whereby it is easily removable and replaceable. Thus servicing of the distributor illustrated is made easy.

Further, the contacts 22 may be prepositioned on the movable breaker plate 34 during manufacture of the breaker plate. The adjusting of the contacts in the field when new contacts are required is therefore much simplified since it requires only a simple spark gap adjustment. Also, with the contacts 22 positioned as shown desirable ventilation thereof is possible. To further simplify the servicing of the distributor illustrated in FIGURE 1 the vacuum diaphragm 98 may be precalibrated and a dust cover may be provided.

Another movable breaker plate 108 and fixed breaker plate 110 are illustrated in FIGURES 12–15. The breaker plate 110 differs from the fixed breaker plate 32 in that the slot 76 in breaker plate 32 is not provided in breaker plate 110. In the structure shown in FIGURES 12–15 the support pads 112 of the movable breaker plate 108 are held in firm contact with the surface of the fixed breaker plate 110 by means of the leaf-spring 114 secured to the fixed breaker plate 110 by convenient means, such as rivet 116, as shown best in FIGURE 15.

The leaf-spring 118 is positioned in recess 120 in the end 122 of the slot 124 to prevent radial movement of the movable breaker plate 108 as before. Also, as explained above, the slot 124 of the fixed breaker plate 110 is provided with the radially wider end 126 whereby the movable breaker plate 108 is readily removable and replaceable in servicing of the contacts which are secured thereto as before.

A third breaker plate assembly for use with the distributor of the invention is illustrated in FIGURES 16–20. The fixed breaker plate 130 of the assembly as shown is positioned within the housing 10 of the distributor and is generally similar to the fixed breaker plates 32 and 110. The movable breaker plate 132 is generally similar to the movable breaker plates 34 and 108 and is secured to the control arm 96 for movement thereby as previously considered.

However the means for maintaining the fixed and movable breaker plates 130 and 132 in a predetermined relative axial and radial position differs from the means for maintaining the fixed and movable breaker plates 32 and 34, and 108 and 110 in a predetermined relative axial and radial position. The spring member 134 is provided for this purpose in conjunction with the fixed and movable breaker plates 130 and 132.

The spring member 134 includes a generally U-shaped body portion 136 adapted to closely surround the portion of the fixed breaker plate 130 between the bottom of the recess 138 and the radial inner surface of the slot 140. The body portion 136 is provided with the terminal flange 142 at one end thereof and the indentation 144 at the other end thereof which cooperate respectively with the recess 138 and a recess 146 in the fixed breaker plate 130 to secure the spring member 134 to the fixed breaker plate 130.

Spring member 134 is also provided with the bowed arms 148 extending from the end 150 thereof which are operable between the L-shaped portion 152 of the movable breaker plate 132 and the radially inner surface of the slot 140 to insure that the movable breaker plate 132 is in a predetermined radial position against the outer radial surface of the slot 140 as before.

Similar bowed arms 154 extend angularly from the body portion 136, as shown best in FIGURES 16 and 20, and are operable between the upper surface of the fixed breaker plate 130 and the adjacent surface of the movable breaker plate 132 to bias the fixed and movable breaker plates into a predetermined relative axial position with the bottom surface of the fixed breaker plate in sliding contact with the adjacent surface of the movable breaker plate 132 as shown best in FIGURE 18.

Thus in accordance with the breaker plate assembly illustrated in FIGURES 16–20 there is provided a single spring member which is easily clipped on the fixed breaker plate and which is operable to bias the fixed and movable breaker plates into a pre-determined relative radial and axial position during adjustment thereof by the adjusting arm 96. Due to the clip-on mounting of the spring member 134 it will be realized that the spring member 134 as well as the movable breaker plate 132 is replaceable in the breaker plate assembly of FIGURES 16–20.

Still another breaker plate assembly including fixed breaker plate 156, movable breaker plate 158, and spring 160 is illustrated in FIGURES 21–26. The fixed breaker plate 156 and movable breaker plate 158 are similar to the breaker plates previously described. The fixed breaker plate 156 is thus secured to the distributor housing 10 while the movable breaker plate 158 is attached to the control arm 96 for movement therewith.

The means for maintaining the fixed and movable breaker plates 156 and 158 in a predetermined relative radial and axial position during angular adjustment thereof comprises the spring member 160 which differs from the means for providing similar positioning of the other fixed and movable breaker plates. The spring member 160, as shown best in FIGURES 24–26, comprises an L-shaped body portion 162 having mounting flanges 164 and 166 at opposite ends thereof. The spring member 160 is mounted on the movable breaker plate 158 by means of the flanges 164 and 166 held within the recesses 168 and 170 of the movable breaker plate 158, as shown best in FIGURE 26.

The spring member 160 further includes the arcuate or bowed arms 172 extending from the end 174 thereof and operable between the radially inner surface of the slot 176 in the fixed breaker plate 156 and the L-shaped portion 178 of the movable breaker plate 158 to bias the L-shaped portion 178 of the movable breaker plate against the radially outer surface of the slot 176 with the movable breaker plate 158 assembled on the fixed breaker plate 156. The arms 180 are also provided on the spring member 162 and are operable between the upper surface of the fixed breaker plate 156 and the movable breaker plate 158 to bias the L-shaped portion of the movable breaker plate 158 into engagement with the bottom surface of the fixed breaker plate 156, as shown best in FIGURES 22–23.

FIGURES 27 and 28 illustrate a modification 156a and 158a of the fixed and movable breaker plates 156 and 158 in which the spring member 160a is held in position in the movable breaker plate 158a in differently positioned recesses 168a and 170a so that the arms 180a act between the bottom surface of the fixed breaker plate 156a and the L-shaped portion 178a of the movable breaker plate 158a to urge the movable breaker plate into engagement with the upper surface of the fixed breaker plate 156a, as shown in FIGURES 27 and 28. The spring member 160a is entirely similar to spring member 160.

Thus in the breaker plate assemblies illustrated in FIGURES 21–28 a single spring member is also used to hold the fixed and movable breaker plates in a desired axial and radial position during relative angular adjustment thereof. However in the modification shown in FIGURES 21–28 the single spring member is secured to the movable breaker plate rather than the fixed breaker plate. The spring members 160 and 160a are of course removable and replaceable as desired along with the movable breaker plates.

In over-all operation the distributor shown in FIGURE 1 having any of the breaker plates illustrated therein is connected to an internal combustion engine (not shown) in the usual manner. As the engine is started and attains a predetermined minimum speed at which spark timing advance is desired the advance weights 18 of the advance weight assembly are caused to pivot about the posts 42 as previously indicated to cause rotation of the integral cam, sleeve and pin member 20, whereby the cam surface 128 is rotated with respect to the contacts 22 secured to the movable breaker plate so that the desired spark timing advance is obtained. Thus using a minimum number of individual parts which are constructed for economical manufacture, efficient advancing of the cam surface 128 is provided in accordance with the speed of rotation of the shaft 12.

In addition the movable breaker plate is caused to be positioned by the precalibrated diaphragm means 28 in accordance with engine vacuum applied thereto to adjust the timing of the contacts opening while maintaining a substantially constant dwell as set forth above. With any of the breaker plate constructions described the movable breaker plate is prevented from undesirable movement either in a direction axial of the shaft 12 or radially with respect thereto by the spring and pin means shown in conjunction with the support pads of the adjustable breaker plates.

Further since the adjustable breaker plates are relatively small and located entirely to one side of the integral cam, sleeve and pin member they may be easily installed and removed. Therefore in servicing of the contacts of the distributor the entire movable breaker plate may be removed and replaced by a new breaker plate having the contacts prealigned during manufacture.

Thus it can be seen that in accordance with the invention there is provided a distributor which is constructed of a minimum number of parts and includes an improved weight advance assembly and vacuum advance assembly both of which are simple in construction, economical to manufacture and efficient in use.

The drawings and the foregoing specification constitute a description of the improved prime distributor in such full, clear, concise and exact terms as to enable any person skilled in the art to practice the invention, the scope of which is indicated by the appended claims.

What we claim as our invention is:

1. A distributor comprising a housing, a rotatably supported shaft extending into said housing, distributor cam means mounted on said shaft rotatable in response to rotation of said shaft, a fixed breaker plate secured within said housing and having an arcuate slot therein concentric with said shaft and cam means and having a radially enlarged portion at one end thereof to facilitate ready removal and replacement of a movable breaker plate within the arcuate slot, a movable breaker plate located within said housing entirely on one side of and in spaced relation to said cam means extending through said slot and on both sides of the fixed breaker plate adjacent the slot, distributor contacts secured to said movable breaker plate and engaged with said cam means for periodic opening on rotation of said cam means, and means for adjusting the position of said movable breaker plate and the contacts secured thereto along said slot relative to the cam means for adjusting the time of opening of said contacts while maintaining a constant dwell time therefor.

2. A distributor comprising a housing, a rotatably supported shaft extending into said housing, distributor cam means mounted on said shaft rotatable in response to rotation of said shaft, an annular fixed breaker plate secured within said housing having an arcuate slot therein concentric with said shaft and cam means, said arcuate slot including a recess in the radially inner wall thereof, a movable breaker plate located within said housing including a longitudinally arcuate portion having an L-shaped cross-section extending through said arcuate slot, single spring means operable between said fixed and movable breaker plates to prevent relative axial and radial movement between the fixed and movable breaker plates comprising a U-shaped body portion the connecting part of which extends between and substantially parallel to the breaker plates and leg parts depending substantially perpendicularly to the connecting part along the inner radius of the fixed breaker plate and the inner radius of the arcuate slot in the fixed breaker plate one of which leg parts terminates in a flange extending toward the other leg part substantially parallel to the connecting part, the other of the leg parts including an indentation therein positioned within the recess in the radially inner wall of the arcuate slot, a pair of bowed arms extending from opposite sides of the body part of the U-shaped portion between the fixed and movable breaker plates and generally circumferentially of the fixed breaker plate, a second pair of bowed arms extending from opposite sides of the leg part within the slot, distributor contacts secured to said movable breaker plate and engaged with said cam means for periodic opening on rotation of said cam means and means for adjusting the position of said movable breaker plate and the contacts secured thereto relative to the cam means to adjust the time of the opening of the contacts.

3. A distributor comprising a housing, a rotatably supported shaft extending into said housing, distributor cam means mounted on said shaft rotatable in response to rotation of said shaft, a fixed breaker plate secured within said housing and having an arcuate slot therein concentric with said shaft and cam means, a movable breaker plate including a longitudinally arcuate portion having an L-shaped cross-section extending through said arcuate slot, a pair of recesses in said longitudinally arcuate portion, single spring means operable between said fixed and movable breaker plates to prevent relative axial and radial movement between the fixed and movable breaker plates comprising an L-shaped body portion extending parallel and between the breaker plates and through said arcuate slot, the ends of the L-shaped body portion terminating in flanges within the recesses in the movable breaker plate to secure the spring to the movable breaker plate, a first set of bowed spring arms extending in opposite directions from the body part extending through the arcuate slot and a second set of bowed spring arms extending from the other part of the body portion from opposite sides thereof in directions substantially circumferentially of the fixed breaker plate, distributor contact secured to said movable breaker plate and engaged with said cam means for periodic opening on rotation of said cam means, and means for adjusting the position of said movable breaker plate and the contacts secured thereto relative to the cam means to adjust the time of opening of the contacts.

4. A distributor comprising a housing, a rotatably supported shaft extending into said housing, distributor cam means mounted on said shaft rotatable in response to rotation of said shaft, a fixed breaker plate secured within said housing and having an arcuate slot therein concentric with said shaft and cam means, a movable breaker plate located within said housing entirely on one side of and in spaced relation to said cam means and extending through said slot in the fixed breaker plate on both sides of the fixed breaker plate adjacent the slot, distributor contacts secured to said movable breaker plate and engaged with said cam means for periodic opening on rotation of said cam means, and adjusting means for adjusting the movable breaker plate along the slot for adjusting the time of opening of said contacts while maintaining a constant dwell time therefor.

5. Structure as claimed in claim 4 wherein means are provided between said fixed and movable breaker plates to prevent radial and axial movement of the movable breaker plate mounted in the arcuate slot.

6. Structure as claimed in claim 5 wherein the means for preventing radial movement of the movable breaker plate relative to the fixed breaker plate includes resilient means acting between the movable breaker plate and one side of the arcuate slot in the fixed breaker plate to bias the movable breaker plate into engagement with the other side of the arcuate slot.

7. Structure as claimed in claim 5 wherein the means for preventing axial movement of the movable breaker plate relative to the fixed breaker plate includes a second arcuate slot in the fixed breaker plate concentric with the first mentioned arcuate slot, a pin mounted on the movable breaker plate and extending through said slot, and resilient means acting between said pin and one surface of the fixed breaker plate to maintain the movable breaker plate in contact with the other surface of the fixed breaker plate.

8. Structure as claimed in claim 4 wherein the movable breaker plate is constructed of a plastic having self-lubricating properties and is provided with a plurality of support pads in surface-to-surface contact with the fixed breaker plate.

9. A movable breaker plate for adjustably supporting distributor contacts, said movable breaker plate being constructed of a self-lubricating plastic in an arcuate configuration to fit entirely on one side of a distributor cam and including a plurality of support pads on one side thereof, said movable breaker plate also including an elongated longitudinally arcuate portion L-shaped in cross-section depending from said one side thereof for adjustably securing the movable breaker plate on a fixed breaker plate and means for securing distributor contacts to the movable breaker plate.

10. A distributor comprising a housing, a rotatably supported shaft extending into said housing, an integral distributor cam, sleeve and pin member mounted on said shaft rotatable in response to rotation of said shaft, a fixed breaker plate secured within said housing and having an arcuate slot therein concentric with said shaft and integral cam, sleeve and pin member, a movable breaker plate located within said housing entirely on one side of and in spaced relation to said integral cam, sleeve and pin member and extending through said slot in the fixed breaker plate on both sides of the fixed breaker plate adjacent the slot, distributor contacts secured to said movable breaker plate and engaged with said integral cam, sleeve and pin member for periodic opening on rotation of said integral cam, sleeve and pin member, an adjusting means for adjusting the movable breaker plate along the slot for adjusting the time of opening of said contacts while maintaining a constant dwell time therefor.

11. Structure as set forth in claim 10 and further including centrifugal means connected to said shaft and operable between said shaft and integral cam, sleeve and pin member to angularly adjust the integral cam, sleeve and pin member relative to the shaft and contacts according to the rotational speed of the shaft comprising a shaft plate secured to the shaft for rotation therewith, a pair of stamped weights of uniform weight pivotally secured to the shaft plate, said weights being arcuate in plan and having therein slots receiving pin portions of the integral cam, sleeve and pin member, adjustable tabs on said shaft plate and resilient means acting between the tabs and weights adjustably biasing the weights into a radially inner position.

12. A spring comprising a body including substantially flat elongated portions connected to each other at one end and extending substantially perpendicularly to each other and a pair of spring arms depending from each of the body portions of the spring and extending in the general plane of the spring body portion from which they depend and having a bowed longitudinal configuration.

References Cited by the Examiner

UNITED STATES PATENTS

| | | | |
|---|---|---|---|
| 1,696,340 | 12/28 | Bohlman | 200—31 |
| 1,785,902 | 12/30 | Hardman | 200—31 |
| 2,008,647 | 7/35 | Schneider | 200—31 |
| 2,306,549 | 12/42 | Luis | 200—31 |
| 2,546,710 | 3/51 | Aldridge | 200—31 |
| 2,610,264 | 9/52 | Fitzsimmons | 200—31 |
| 2,643,304 | 6/53 | Lautzenhiser | 200—31 |
| 2,676,404 | 4/54 | Peckton et al. | 267—1 |
| 2,717,286 | 9/55 | Bates | 200—31 |
| 2,801,304 | 7/57 | Winkley | 200—30 |
| 2,965,726 | 12/60 | Norris et al. | 200—31 |

FOREIGN PATENTS

| | | |
|---|---|---|
| 751,326 | 6/33 | France. |
| 624,248 | 6/49 | Great Britain. |

BERNARD A. GILHEANY, *Primary Examiner.*

MAX L. LEVY, *Examiner.*